(12) United States Patent
Yabe et al.

(10) Patent No.: US 6,624,252 B2
(45) Date of Patent: Sep. 23, 2003

(54) SEALING DEVICE

(75) Inventors: Toshikazu Yabe, Kanagawa (JP); Takahiko Uchiyama, Kanagawa (JP); Keisuke Yokoyama, Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 10/013,954

(22) Filed: Dec. 13, 2001

(65) Prior Publication Data

US 2002/0113376 A1 Aug. 22, 2002

(30) Foreign Application Priority Data

Dec. 15, 2000 (JP) ..................... P2000-382733

(51) Int. Cl.$^7$ ..................... C08L 27/12; F16C 29/06; F16C 33/76; F16H 25/24; B29C 43/02
(52) U.S. Cl. ..................... 525/199; 525/240; 523/149; 49/475.1; 277/590; 277/602; 277/628; 384/26; 384/44; 384/50; 384/477
(58) Field of Search .................. 525/199, 240; 523/149; 384/26, 44, 50, 477; 49/475.1; 277/590, 602, 628

(56) References Cited

U.S. PATENT DOCUMENTS 5,459,202 A * 10/1995 Martinez et al. ............ 525/200
5,548,028 A * 8/1996 Tabb .......................... 525/194

* cited by examiner

*Primary Examiner*—Nathan M. Nutter
(74) *Attorney, Agent, or Firm*—Sughrue Mion, PLLC (57) ABSTRACT

A sealing device equipped with a lip made of a rubber material composition wherein the rubber material composition comprises 100 parts by weight of a tetrafluoroethylene-propylene copolymer and 0.02 to 10 parts by weight of an ethylene-propylene-based copolymer is described, by which a long life sealing device that is not deteriorated even when used under an environment where chemicals such as a cutting lubricant containing an additive adversely affecting rubbers contact the sealing device is provided.

3 Claims, 6 Drawing Sheets

SEALING DEVICE

FIELD OF THE INVENTION

The present invention relates to a sealing device, and in particular to a sealing device such as a seal and an oil seal used for sealing rolling apparatuses including a rolling bearing, a linear guide apparatus and ball screw.

BACKGROUND OF THE INVENTION

Conventionally, the lip of the sealing device used for the applications described above has been most generally made of rubber material compositions mainly comprising NBR (acrylonitrile-butadiene rubber) taking oil resistance into consideration.

In cases where heat resistance and chemical resistance are required, those material compositions which mainly comprise an acrylic rubber, a silicone rubber or a fluorine-contained rubber (FKM) have been used.

However, the sealing devices using the conventional rubber material compositions described above had the following drawbacks.

In recent years, the number of revolution has increased for the principal spindle of machine tools and, as for tools in general, highly heat-resistant materials as well as heat-resistant coating technologies have been developed to a noticeable degree. Accordingly, cutting works are conducted at an ever-increasing speed and efficiency.

To cope with these advances, the cutting lubricant used in cutting work is required to be provided with the highest level of cooling capability absorbing the enormous amount of heat generated in the vicinity of the cut point, the permeability with which the oil can instantaneously reach the cut point, and a lubricating property for the cut point of an elevated temperature and a high pressure. To meet these requirements, soluble-type synthetic cutting coolants are recently being used instead of the conventional emulsion-type cutting lubricants.

The soluble-type synthetic cutting coolant, which can be subjected to waste water treatment due to its perfect solubility in water different from the emulsion-type cutting lubricant, has the most prominent advantage of a high permeability as a result of incorporation of a variety of additives such as amines in a large quantity. Accordingly, such a soluble-type synthetic cutting coolant exhibits a high permeability toward rubber materials, too.

Machine tools include a number of sealing devices and oil seals for rolling apparatus such as rolling bearings and linear guide apparatus. These sealing devices are brought into contact with the cutting lubricant during cutting works. When the lip made of a rubber material composition of the sealing device contacts with the cutting coolant mentioned above, the cutting coolant causes the lip material to swell and soften due to its high permeability. Thus, the mechanical strength of the lip may be deteriorated. In the case of a contact-type sealing device, an exposed thread of the seal expands and promotes wearing, resulting in the deterioration of sealing property, which may lead to a reduced life of the machine tool itself.

In the case where the rubber is FKM (a vinylidene fluoride-hexafluoropropylene-based fluorine-contained rubber or a vinylidene fluoride-hexafluoropropylene-tetrafluoroethylene-based fluorine-contained rubber), hydrogen fluoride (HF) is eliminated from the vinylidene fluoride moiety amply present in the rubber structure by the action of the amine-based additives. Such a reaction may probably lead to the decomposition of the rubber accompanying the deterioration of its mechanical strength.

Generally speaking, sealing devices are composed of a rubber-made member made of a rubber material composition, and a reinforcing member such as a metal mandrel for the rubber part wherein the two members are integrally bonded together. The various additives such as amine-based additives in the cutting lubricant may attack and modify the adhesive used to bond the rubber-made member to the reinforcing member. Then, the adhesive strength may probably be weakened to lead to the separation of the two members.

As an actual example, when a sealing device in which the rubber-made member comprises a nitrile rubber and bonds to a metal mandrel by means of vulcanization adhesion with use of a phenol resin-based adhesive is immersed in an aqueous dilution of the soluble-type synthetic cutting coolant for a long time, the adhesive was attacked in addition to the swelling and softening of the rubber itself, and in some cases the rubber-made member is entirely separated off from the metal mandrel.

It is also anticipated that a similar problem may occur for such sealing devices used for machinery and tools that may contact with antifreeze solutions and engine oils for automobiles since these fluids also contain a large amount of additives such as amine-based additives that have an adverse effect on rubbers.

SUMMARY OF THE INVENTION

Hence, the object of the invention is to solve the above-described problems associated with the conventional sealing devices, and to provide a sealing device operating for a long life without suffering from deterioration even when used in an environment where the sealing device is in contact with various chemicals including cutting lubricants containing additives having an adverse effect on rubbers.

To achieve the object described above, the invention is constructed as follows. According to the invention, in a sealing device equipped with a lip made of a rubber material composition, the rubber material composition is characterized by comprising 100 parts by weight of a tetrafluoroethylene-propylene copolymer and 0.02 to 10 parts by weight of an ethylene-propylene-based copolymer.

Since such a constitution is provided with an excellent chemical resistance against various additives such as amine-based additives and thus stands well spoilage, the sealing device can operate for a long life even when used in an environment where chemicals including cutting lubricants containing the above described various additives contact therewith. Correspondingly, the machinery and tools equipped with the sealing device of the invention can enjoy a long life.

The sealing device of the invention may have a structure comprising an rubber-made member comprising the above described rubber material composition (including a lip) bonded to a reinforcing member that reinforces the rubber-made member. There is no restriction on the shape of said reinforcing member so long as the reinforcing member made of a metal or a plastic can impart a sufficient strength to said sealing device.

DESCRIPTION OF THE REFERENCE NUMERALS AND SIGNS

1 Guide rail
2 Slider
12 Sealing device
12d Lip
31 Screw shaft
32 Nut for a ball screw
42 Sealing device
42b Mandrel
42c Seal body
42d Seal tip
50 Oil seal
51a Lip
61 Sealing device
71b Main lip

DETAILED DESCRIPTION OF THE INVENTION

The composition for the rubber material composition used for the sealing device of the invention will be described below in detail.

The rubber material composition of the invention contains a tetrafluroethylene-propylene copolymer as a rubber raw material and an ethylene-propylene-based copolymer acting as a mold-releasing agent. According to need, various fillers, vulcanizing additives and supplementary additives for processing are appropriately incorporated to make the material composition further suited for a variety of applications.

The ethylene-propylene-based copolymer to be combined with the tetrafluroethylene-propylene copolymer must be used in 0.02 to 10 parts by weight per 100 parts by weight of the tetrafluroethylene-propylene copolymer. With an amount less than 0.02 parts by weight, the releasability from metal molds becomes insufficient, while with over 10 parts by weight the heat resistance and chemical resistance of the overall rubber material composition are deteriorated. To make these properties preferably good, the amount of the ethylene-propylene-based copolymer should more preferably be 0.3 to 3 parts by weight per 100 parts by weight of the tetrafluoroethylene-propylene copolymer.

The tetrafluoroethylene-propylene copolymer is basically a bipolymer, and as the copolymerization ratio, the tetrafluoroethylene component is preferably from 40 to 70 in mol % and the propylene component is preferably from 60 to 30 in mol %, that is, the copolymerization ratio is preferably 40:60 to 70:30 in mol %.

The tetrafluoroethylene component acts to improve chemical resistance as well as heat resistance while the propylene component enhances elasticity. Accordingly, with over 70 mol % contents of tetrafluoroethylene component (i.e., with less than 30 mol % of propylene), the tetrafluoroethylene-propylene copolymer exhibits an insufficient elasticity. On the other hand, with less than 40 mol % of tetrafluoroethylene (i.e., with over 60 mol % of propylene), an insufficient chemical resistance and a heat resistance are imparted to the copolymer.

If required and necessary, a small quantity of a third copolymerization component may be introduced.

Since the tetrafluoroethylene-propylene copolymer excels in chemical resistance as a fluorine-contained rubber, spoilage such as swelling and softening is difficult to occur even when the copolymer contacts with highly permeable chemicals.

Since the tetrafluoroethylene-propylene copolymer is free of vinylidene fluoride moiety in its molecular structure, it does not undergo HF elimination reactions if it comes to contact with chemicals containing an amine-based additive. Thus, spoilage or degradation of mechanical strength is scarce. As, by these mechanisms, the sealing device of the invention equipped with a lip made of the rubber material composition described heretofore can maintain a high sealing property over a long period, the sealing device of the invention and the machinery and tools provided with such a sealing device are characterized by a very long operating life.

It should be noted that the absence of vinylidene fluoride moiety makes the vulcanizing property poor. However, the vulcanizing property can be improved by copolymerizing an iodine- or a bromine-containing monomer (as a third copolymerization component) to enable vulcanization with use of an organic peroxide, or by heat treatment.

As the manufacturing method of the tetrafluoroethylene-propylene copolymer, one can adopt any known one including bulk polymerization, suspension polymerization, emulsion polymerization and solution polymerization. From the viewpoint of the type of polymerization initiator, one can adopt a catalytic polymerization using a free radical initiator, an ionization radiation polymerization and a redox polymerization.

As the ethylene-propylene-based copolymer, in addition to the bipolymers, terpolymers obtained by copolymerizing a third component with ethylene and propylene can also be used. Some examples of the third component include non-conjugated diene monomers containing double bonds such as 1,4-hexadiene, dicyclopentadiene and 5-ethylidene-2-norbornene.

The copolymerization ratio of the ethylene component to the propylene component is preferably from 50:50 to 90:10 in mol %. With a larger content of propylene component exceeding the upper limit, the vulcanization with an organic peroxide becomes difficult. This unfavorable tendency is prominent particularly for bipolymers.

In the case where the ethylene-propylene-based copolymer is the terpolymer, the content of the third component should preferably be up to 10 mol % of the total amount of the monomers constituting the ethylene-propylene-based terpolymer.

The ethylene-propylene-based copolymer exhibits a poor compatibility with the tetrafluoroethylene-propylene copolymer in which fluorine atoms are present in the molecule at a large quantity. Therefore, when a small amount of the ethylene-propylene-based copolymer is mixed into the tetrafluoroethylene-propylene copolymer, the former tends to be localized mainly at the surface of the resulting rubber material composition. Since the surface-localized ethylene-propylene-based copolymer works as an effective internal mold-releasing agent even when added in a small amount, the releasing from metal molds markedly improves in the vulcanization molding operation, thus enabling a precise molding for sealing devices having a complex structure.

Moreover, the ample presence of the ethylene-propylene-based copolymer at the surface enables vulcanization adhesion of the rubber to the reinforcing member such as a metal mandrel; in other words, the adhesive strength improves. It should be noted that such vulcanization adhesion was quite difficult with a rubber material composition solely comprising the tetrafluoroethylene-propylene copolymer. This advantageous effect is prominent when an ethylene-propylene-based copolymer of EPDM type in which double bonds remain in the molecular structure is employed.

Concretely, a desirably strong adhesion of the rubber material composition with a reinforcing member made of, for example, a metal can be secured by making use of the superficial portion amply containing the ethylene-propylene-based copolymer and using a silane-based adhesive comprising a silane coupling agent containing a vinyl group and/or an amino group.

Specific examples of the silane coupling agent containing a vinyl group include vinyltriethoxysilane, and γ-methacryloxypropyltrimethoxysilane. The silane coupling agent containing an amino group is exemplified by γ-aminopropyltriethoxysilane.

The mechanism with which the ethylene-propylene-based copolymer and a metal are firmly bonded with a silane-based adhesive containing a silane coupling agent will be explained.

The alkoxy group in the silane coupling agent is hydrolyzed to a silanol group, which then undergoes a coupling reaction (dehydrating condensation reaction) with the OH group present in the metal surface to form a chemical bond. Simultaneously, the vinyl and amino groups contained in the silane coupling agent undergo cross-linking reactions with the double bond in the ethylene-propylene-based copolymer and/or with a peroxide, and the coupling agent is taken into the structure of the ethylene-propylene-based copolymer. Through such reactions, the rubber material composition and the metal are chemically bonded via the silane coupling agent to achieve a firm adhesion.

Now, various fillers, vulcanization additives and supplementary additives for processing to be incorporated into the rubber material composition are described in detail.

Fillers enhance the mechanical strength of the rubber material composition, and examples thereof include carbon black, talc, wollastonite and mistron paper. The filler is added at an amount of 20 to 70 parts by weight per 100 parts by weight of the rubber raw material. By the way, acid fillers such as silica and clay are not preferred since they act to retard vulcanization.

Vulcanization additives include a vulcanizing (cross-linking) agent and a vulcanization-accelerating aid.

Preferable vulcanizing agents include organic peroxides since both of the rubber raw material and the ethylene-propylene-based copolymer must be vulcanized (cross-linked). Specifically, dicumyl peroxide, 2,5-dimethyl-2,5-di (t-butylperoxy)hexane, benzoyl peroxide and 1,3-bis(t-butylperoxy)diisopropylbenzene are used preferably at an addition amount of 0.5 to 10 parts by weight per 100 parts by weight of the rubber raw material.

As the vulcanization accelerating aid are preferred compounds having a number of unsaturated groups such as unsaturated hydrocarbon groups. Specifically, polyallyl compounds such as triallylisocyanurate and triallylcyanurate and methacrylate compounds such as trimethylolpropane trimethacrylate are used preferably at an addition amount of 0.5 to 10 parts by weight per 100 parts by weight of the rubber raw material.

The hardness of the rubber material composition of the invention preferably lies in the range of 60 to 90 in terms of spring hardness measured by means of the Durometer A scale according to JIS K6301 by considering the sealing property as well as the deformation compliance when the material composition is used in a contact-type sealing device.

In cases where the spring hardness does not reach 60, though it depends on the type of the sealing device, the relative movement between the member holding the sealing device and the member to be sealed in machinery and tools (for example, rolling apparatus) using the sealing device deforms the lip to an unnecessarily large extent, thus the frictional load becomes excessively large. As a result, a smooth movement between the members is hindered.

On the other hand, with a spring hardness over 90, the elasticity reduces as described above. Then, the compliance of the lip in response to the movement deteriorates, resulting in an imperfect sealing. Therefore, when the sealing device is used under an environment rich in dust or foreign matter, the life of the machinery and tools is determined by the environmental condition under which the machinery and tools have been used.

To secure particularly preferable properties such as the degree of deformation and elasticity for the lip, the spring hardness of the rubber material composition should lie in the range of 70 to 80.

Furthermore, in order to make the lip readily deform in compliance with the above cited movement and thus prevent the lip from damaging, it is preferred that the rubber material composition has not only a hardness in the above mentioned range, but also the mechanical properties including a tensile breaking elongation of 200% or more and a tensile breaking strength of 13 MPa or more.

A few sealing devices associated with the invention are described in detail with reference to drawings.

First Embodiment

Figure 1:
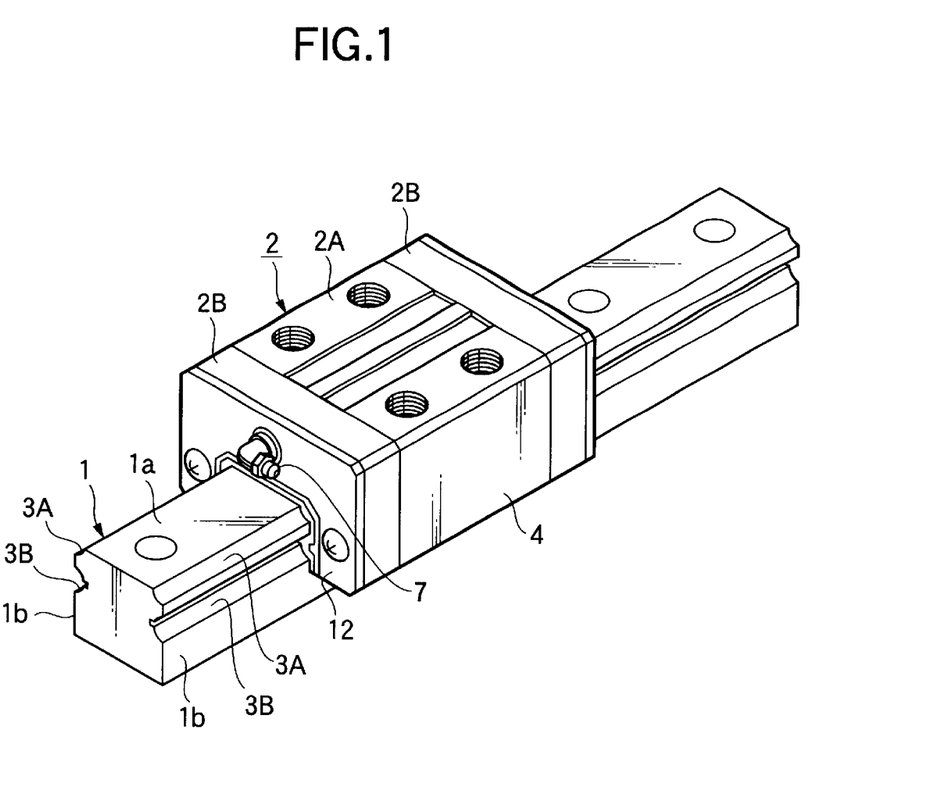
FIG. 1 is an oblique perspective view of a linear guide apparatus equipped with a sealing device associated with the invention.

FIG. 1 is an oblique perspective view of a linear guide apparatus equipped with a sealing device related to the invention.

A slider 2 having "U"-shaped cross-section sits astride a guiding rail 1 having a roughly square cross-section in such a manner as to be movable in the lengthwise (axial) direction of the rail. Slider 2 comprises a slider body 2A and two end-caps 2B detachably fixed at the ends along the axis. At the ridge line portion where the upper plane 1a and each side plane 1b of guide rail 1 intersect, there is provided, along the axis, a first concave groove 3A that has an almost quadrant cross-section to allow a first rolling element to roll. Further, in the middle of each side plane 1b of guide rail 1, a second groove 3B having a substantially semicircular cross-section to pass a second rolling element in the axial direction.

On the other hand, at the inside corner of each of the two sleeves 4 of slider body 2A, a groove (not shown in the figure) that has an almost semicircular cross-section, faces groove 3A of guide rail 1, and guides the rolling element. Similarly, in the middle of the inner side plane of each sleeve 4 is provided a second groove (not shown in the figure) having a substantially semicircular cross-section to guide the second rolling element and facing the second groove 3B of guide rail 1.

Two aisles for the rolling elements are formed by guide grooves 3A and 3B of guide rail 1 together with the two grooves provided in the both sleeves 4. These routes, which are not shown in the figure, run straight with an almost circular cross-section.

At the upper and lower parts in the inside of the thick portion of slider body 2A close to sleeve 4, there are provided two aisles which run along the axial direction with a circular cross-section and through which the rolling elements return (not shown).

Each of end-cap 2B further includes a curved aisle (not shown) connecting the aisle for the rolling element and the returning one running parallel thereto. The two aisles and the curved aisles form a circulation loop for the rolling element. In cases where the rolling element is a steel ball, many rolling elements are charged in the loop so as to be able to freely roll and move.

Slider 2 in engagement to guide rail 1 smoothly moves along guide rail 1 via the rolling of the rolling elements in the aisles for the rolling elements. And during the movement of the slider, the rolling elements circulate endlessly through the circulation loop in slider 2.

To slider 2, a sealing device 12 (of contact type) is attached, which seals the gap opening formed between the slider 2 and guide rail 1 for dust prevention, at the both ends in the axial direction (on the external surface of end-cap 2B). This sealing device 12 comprises a rubber material composition containing a tetrafluoroethylene-propylene copolymer and an ethylene-propylene-based copolymer (A detailed description thereon will be given below.), and a metal mandrel (a reinforcing member) made of SECC material (galvanized sheet iron) that has an almost "U" shape in conformity to the shape of end-cap 2B, these two members being unified together by vulcanization adhesion.

At least the portion of sealing device 12 in a slidable contact with guide rail 1 is composed of the rubber material composition. The material composition is fabricated in a shape such that the material composition can slidably contact the upper plane 1a and the both side planes 1b of guide rail 1 in conformity with the cross-sectional shape of guide rail 1 thus sealing the gap between slider 2 and guide rail 1. However, in order to securely seal the gap between the slider and guide rail 1, the inner dimension of the sealing device is made slightly smaller (by about 0.3 to 0.4 mm) than the length of contact with the surface of guide rail 1. It should be noted, however, that the metal mandrel is not in contact with guide rail 1.

Figure 2:
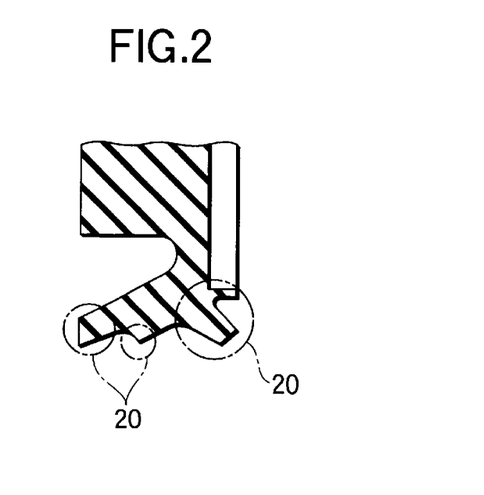
FIG. 2 is a partially enlarged view showing the shape of the lip in the sealing device for the linear guide apparatus shown in FIG. 1.

As is depicted in FIG. 2, the portion (lip portion) of the rubber material composition lying inside of sealing device 12 and in a slidable contact with guide rail 1 has three protrusions 20. Owing to these protrusions, an excellent sealing capability is achieved. The number of such protrusions need not be restricted to 3, but may be 1, 2, 4 or more.

Next, the rubber material composition forming sealing device 12 is described. The rubber material composition was manufactured by the following procedures with use of a rubber raw material (tetrafluoroethylene-propylene copolymer), an ethylene-propylene-based copolymer as an internal mold-releasing agent, and other additives. These ingredients were mixed at the ratios shown in Table 1.

TABLE 1

|  | Example 1 | Compar. Example 1 | Compar. Example 2 | Compar. Example 3 | Compar. Example 4 | Compar. Example 5 |
| --- | --- | --- | --- | --- | --- | --- |
| Rubber Raw Material A | 100 | 100 |  |  |  |  |
| Rubber Raw Material B |  |  | 100 |  |  |  |
| Rubber Raw Material C |  |  |  | 100 |  |  |
| Rubber Raw Material D |  |  |  |  | 100 |  |
| Rubber Raw Material E |  |  |  |  |  | 100 |
| Internal Mold-releasing Agent | 2 |  |  |  |  |  |
| Reinforcing Agent | 30 | 30 | 30 | 30 | 20 | 50 |
| Cross-linking Agent | 1 | 1 | 1 |  | 1.5 | 3 |
| Vulcan. Accel. Aid A |  |  |  | 3 | 3 |  |
| Vulcan. Accel. Aid B |  |  |  | 6 | 3 |  |
| Vulcan. Accel. Aid C | 5 | 5 | 3 |  | 4 |  |
| Vulcan. Accel. Aid D | 1 | 1 |  |  |  |  |

TABLE 1-continued

|  | Example 1 | Compar. Example 1 | Compar. Example 2 | Compar. Example 3 | Compar. Example 4 | Compar. Example 5 |
|---|---|---|---|---|---|---|
| Vulcan. Accel. Aid E |  |  |  |  |  | 5 |
| Vulcan. Accel. Aid F |  |  |  |  |  | 1 |
| Vulcan. Accel. Aid G |  |  |  |  |  | 2 |
| Plasticizer |  |  |  |  |  | 5 |
| Antioxidant A |  |  |  |  |  | 1 |
| Antioxidant B |  |  |  |  |  | 1 |

Unit: parts by weight.

First of all, each of the materials used (shown in Table 1) will be described.

Rubber Raw Material A: a tetrafluoroethylene-propylene bipolymer, AFLAS 150P, a product of Asahi Glass Company Ltd.

Rubber Raw Material B: a vinylidene fluoride-tetrafluoroethylene-propylene terpolymer (vinylidene fluoride content=2 to 5 mol %, vulcanization accelerating agent included), AFLAS SP, a product of Asahi Glass Company Ltd.

Rubber Raw Material C: a vinylidene fluoride-tetrafluoroethylene-propylene terpolymer (vinylidene fluoride content=30 mol %, vulcanization accelerating agent included), AFLAS MZ201, a product of Asahi Glass Company Ltd.

Rubber Raw Material D: a vinylidene fluoride-hexafluoropropylene bipolymer ((vinylidene fluoride content=65 to 75 mol %), Daiel G-801, a product of Daikin Industries, Ltd.

Rubber Raw Material E: a nitrile rubber (medium-high acrylonitrile content), JSR NBR N230S, a product of JSR Corporation Internal mold-releasing agent: an ethylene-propylene-non-conjugated diene copolymer (non-conjugated diene monomer=5-ethylidene-2-norbornene), JSR EP21, a product of JSR Corporation Reinforcing agent: MT carbon black, Thermax N-990, a product of R. T. Vanderbilt Co., Inc.

Cross-linking agent: 1,3-bis(t-butylperoxy)diisopropyl-benzene, Perbutyl P, a product of NOF Corporation Vulcanization accelerating aid A: MgO, Kyowa Mag 30, a product of Kyowa Chemical Industry Co., Ltd.

Vulcanization accelerating aid B: $Ca(OH)_2$, Rhenofit CF, a product of Rhein Chemie, Ltd.

Vulcanization accelerating aid C: triallyl isocyanurate, TAIC, a product of Nippon Kasei Co.

Vulcanization accelerating aid D: sodium stearate made by Wako Pure Chemical Industries, Ltd.

Vulcanization accelerating aid E: zinc oxide, France No. 1, a product of Sakai Chemical Industry Co., Ltd.

Vulcanization accelerating aid F: stearic acid, Lunac S-35, a product of Kao Corporation.

Vulcanization accelerating aid G: an organic amine, Akting SL, a product of Yoshitomi Pharmaceutical Co., Ltd.

Plasticizer: dioctyl phthalate, DOP made by Daihachi Chemical Industry Co., Ltd.

Antioxidant A: 4,4'-bis-($\alpha,\alpha$-dimethylbenzyl) diphenylamine, Nocrack CD, a product of Ouchi Shinko Chemical Industries, Co., Ltd.

Antioxidant B: 2-mercaptobenzoimidazole, Nocrack MB, a product of Ouchi Shinko Chemical Industries, Co., Ltd.

Each step for the manufacture of sealing device 12 is explained below.

(1) Mastication

The materials shown in Table 1 except the cross-linking agents were thrown into a Banbury mixer, and mastication was carried out under the mixer temperature of 80° C.

(2) Kneading

The crude-blended material was taken out of the Banbury mixer and charged in a dual roll blender for rubber kneading. Along with the adjustment of the roll temperature at 50° C., the cross-linking agents listed in Table 1 were added. The resulting material was kneaded and cut many times until a homogeneous material was obtained. The resulting material was fabricated into a sheet.

(3) Vulcanization and Vulcanization Adhesion

A vulcanizing mold for 2 mm thick sheet was attached on a hot-press heated to 170° C., on which the sheet obtained by kneading was placed. After 20 min heating, a vulcanized rubber sheet was obtained of 150 mm length, 150 mm width and 2 mm thickness.

Sealing device 12 was produced by integrating by means of vulcanization adhesion the rubber sheet prepared above with a metal mandrel (roughly "U" shaped, having three holes for fixing screws) made of SECC enameled with an adhesive in advance with use of such a metal mold as to be able to provide a targeted structure. In Example 1 and Comparative Examples 1 to 4, Chemlok Y4310 (a silane-based adhesive containing a silane coupling agent having a vinyl group) made by Rhode Far East, Inc., was used as the adhesive, while in Comparative Example 5 Metalok N-15 (a phenol resin-based adhesive) made by Toyo Chemical Research Lab. Ltd. was used.

A secondary vulcanization was performed on each of these sealing devices 12 by heating at the following temperature and duration.

Example 1: 200° C., 4 hours

Comparative Example 1: 200° C., 4 hours

Comparative Example 2: 200° C., 24 hours

Comparative Example 3: 230° C., 24 hours

Comparative Example 4: 180° C., 4 hours

Comparative Example 5: 150° C., 2 hours

Among these Examples, the conditions for Comparative Example 5 do not reach those for secondary vulcanization but those for a simple heat treatment.

The rubber material compositions thus prepared (Example 1 and Comparative Examples 1 to 5) were subjected to the measurements of various physical properties. The results are shown in Table 2.

TABLE 2

|  | Example 1 | Compar. Example 1 | Compar. Example 2 | Compar. Example 3 | Compar. Example 4 | Compar. Example 5 |
| --- | --- | --- | --- | --- | --- | --- |
| Hardness $HD_A$ | 71 | 70 | 76 | 74 | 69 | 76 |
| Tensile Breaking Strength (MPa) | 21.2 | 20.9 | 18.2 | 13.7 | 20.9 | 13.0 |
| Tensile Breaking elongation (%) | 250 | 260 | 220 | 210 | 460 | 400 |
| Volume Change (%) | 0.3 | 0.3 | 1.2 | 3.0 | 5.3 | 15.3 |
| Initial Remaining Area (%) | 100 | 0 | 100 | 100 | 100 | 100 |
| Remaining Area after Immersion (%) | 100 | Not tested | 100 | 100 | 100 | 0 |

The measuring method for each physical property is as follows.

(a) Hardness Test

Each vulcanized sheet was punched into a JIS #3 test piece. Three pieces were superposed and subjected to the hardness measurement according to JIS K6301.

(b) Tensile Test

On a JIS #3 test piece, a tensile test was conducted by using a universal tester according to JIS K6251 to measure the tensile breaking strength and elongation.

(c) Volume-Changing Ratio

In a liquid obtained by diluting a soluble-type synthetic cutting coolant (Yushiroken Synthetic #660, a product of Yushiro Chemical Industry Co., Ltd.) with water, the JIS #3 test piece was immersed for one week at 70° C. The volumes before and after the immersion were measured to obtain the ratio of the volume change caused by the immersion. The soluble-type synthetic cutting coolant was diluted roughly 20 times, which gives the working concentration for practical use. The values of volume-change ratio in Table 2 are all positive, indicating that all the test pieces swelled.

(d) Adhesion Test

Sealing device 12, which was produced with each rubber material composition of Example 1 and Comparative Examples 1 to 5, was immersed in the liquid used for the volume-changing test under the same condition. Before and after the immersion, a 900 peeling test (JIS K6310) was conducted to evaluate the change in adhesion caused by the immersion.

When the sealing device in which the rubber material composition and the metal mandrel are firmly bonded is subjected to the peeling test, peeling does not take place at the bonding surface but the rubber material composition itself is destroyed, and remains on the bonding surface still adhering thereon. In contrast, in the case where the rubber material composition is not so firmly bonded to the metal mandrel, peeling takes place at the bonding surface, thus not leaving the rubber material composition thereon.

The result of the peeling test was expressed by the area of the rubber material composition remaining on the bonding surface. In Table 2, the remaining area of 0% means that the peeling took place on the entire area of the bonding surface leaving no rubber material composition thereon at all, while the remaining area of 100% indicates that the rubber material composition remains at the entire bonding surface.

First of all, the volume-changing ratio is discussed. As is evident from the results on Example 1 and Comparative Examples 1 to 4 in Table 2, the volume-changing ratio reduces with the decrease of the vinylidene fluoride content in the rubber raw material. Particularly, the pieces of Example 1 and Comparative Example 1 that are free of vinylidene fluoride exhibit substantially no swelling when immersed in the soluble-type synthetic cutting coolant containing amine-based additives. In Comparative Example 5 where the rubber raw material is a nitrile rubber, a noticeable swelling was observed.

Next, the result of the adhesion test is discussed. In Comparative Examples 2 to 4, the pieces excel in the initial adhesion and exhibit no deterioration of adhesion even after the immersion owing to the use of the rubber raw material containing vinylidene fluoride. Comparative Example 1 where a vinylidene fluoride-free rubber raw material is used shows no adhesive affinity at the initial stage. In contrast, in Example 1 where the rubber raw material is also free of vinylidene fluoride but is added with the ethylene-propylene-non-conjugated diene terpolymer as the ethylene-propylene-based copolymer, the piece not only excels in the initial adhesion but also exhibits no deterioration of adhesion even after the immersion. In Comparative Example 5 where a phenol resin-based adhesive is used, the initial adhesion was excellent, which is lost due to the change in the adhesive property caused by the immersion.

As has been explained heretofore, sealing device 12 using the rubber material composition of Example 1 has a long life, since it shows neither decomposition nor strength lowering in the rubber material composition even when used in an environment where amine-based additives are in contact with the device, since the device uses a tetrafluoroethylene-propylene copolymer as the rubber raw material. Correspondingly, the life of the linear guide apparatus equipped with this sealing device 12 can enjoy a long machine life.

Further, owing to the incorporation of the ethylene-propylene-based copolymer into the rubber material composition, vulcanization bonding to a reinforcing member made of a metal, etc., can be performed. The resulting adhesive property is not weakened by the contact with chemicals containing amine-based additives.

Second Embodiment

Figure 3:
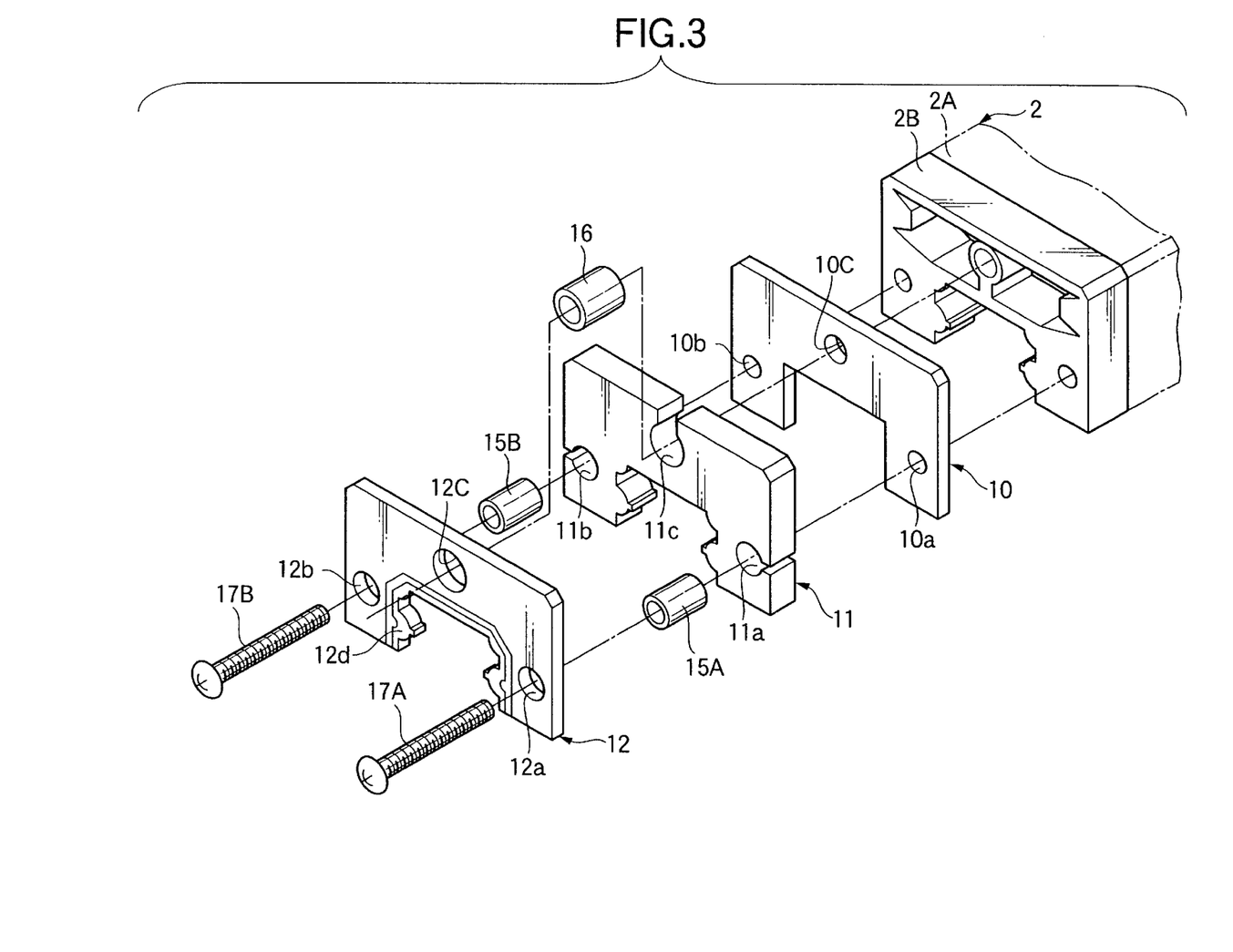
FIG. 3 is an oblique perspective view showing the arrangement of each member at the end of a linear guide apparatus equipped with a sealing device associated with the invention.

FIG. 3 is an oblique perspective view showing the arranged and fixed states of the members used for the end portion of a linear guide apparatus equipped with a sealing device associated with the invention. Since the structure of this linear guide apparatus in the second embodiment is substantially the same as that of the linear guide apparatus in the first embodiment, only differences are described without repeating the explanation on the similar members. In FIG. 3, the same coding number as in FIG. 1 is given to the same or corresponding member.

At the outer side of an end-cap 2B fixed to the end along the axial direction of a slider body 2A in a slider 2 are fixed, from the end-cap side, a reinforcing plate 10, a lubricant-feeding member 11 made of a lubricant-containing polymer and a sealing device 12 in a superimposed relation. Among these constituting members, sealing device 12 has strictly the same structure as that of the first embodiment.

Reinforcing plate 10, which is a roughly "U" shaped steel plate in conformity with the shape of end-cap 2B, is not in contact with guide rail 1. Lubricant-feeding member 11 sandwiched by sealing device 12 and reinforcing plate 10 is also roughly "U" shaped in conformity with the shape of end-cap 2B, as is shown in FIG. 3 in an oblique perspective view. Similarly to the corresponding portion of sealing device 12, the inner, central portion of the "U" of lubricant-feeding member 11 is shaped in conformity with the cross-section of guide rail 1 such that it does not contact with the upper plane 1a as well as the both side planes 1b of guide rail 1 or is in a slidable contact with the planes at least at a portion thereof (The gap between lubricant-feeding member 11 and guide rail 1 is set to 0 to 0.2 mm.).

The composition of the lubricant-containing polymer is 10% by weight, based on the amount of the lubricant-containing polymer, of an ultra-high molecular weight polyethylene, 20% by weight, based on the amount of the lubricant-containing polymer, of a high-density polyethylene (of a relatively low molecular weight) and 70% by weight, based on the amount of the lubricant-containing polymer, of a paraffin-based mineral oil. Lubricant-feeding member 11 was produced by injection molding the lubricant-containing polymer of the above composition. There is no special restriction on the composition as well as the molding method of the lubricant-containing polymer; they can be appropriately altered depending on needs.

Lubricant-feeding member 11 has penetrating holes 11a and 11b which fixing screws penetrate when the member is fixed to slider body 2A, and a penetrating hole 11c used to a fix grease nipple 7. Each of the penetrating holes 11a, 11b and 11c is fabricated such that a tubular sleeve 15A, 15B or 16 can be fitted in, and grease nipple 7 goes through the fitted sleeve 16. The length of sleeve 15A, 15B or 16 is made equal to or slightly longer (about 0.2 mm) than the thickness of lubricant-feeding member 11.

The external diameters of sleeves 15A and 15B are fabricated larger than the diameters of penetrating holes 12a, 12b of sealing device 12 and of penetrating holes 10a and 10b of reinforcing plate 10. Therefore, when lubricant-feeding member 11 is sandwiched and fastened tight between sealing device 12 and reinforcing plate 10 by means of fixing screws 17A and 17B, the tightening pressure does not reach lubricant-feeding member 11, thus not hindering the self-contraction of lubricant-feeding member 11.

As is shown in FIG. 3 showing the arrangement of sealing device 12, lubricant-feeding member 11 and reinforcing plate 10 in an oblique perspective view, these three members are fixed to slider body 2A together with end-cap 2B by the fixing screws 17A and 17B penetrating holes 12a and 12b provided in sealing device 12, holes 11a and 11b provided in lubricant-feeding member 11 and holes 10a and 10b provided in reinforcing plate 10. 12c indicates a penetrating hole provided in sealing device 12 and used to fix grease nipple 7, and 10c indicates a penetrating hole provided in reinforcing plate 10 used to fix grease nipple 7.

In the linear guide apparatus of such a constitution, the sealing devices 12 perfectly seal the gaps between the planes of guide rail 1 and those of slider 2 facing each other at the front and rear ends of the slider. Accordingly, so long as sealing device 12 is not frictionally worn out, invasion of dusts or foreign matters from the front and rear ends of slider 2 can be perfectly prevented.

Moreover, when the linear guide apparatus is operated, lubricant-feeding member 11 also moves separated from or in contact with guide rail 1 whereby the lubricant gradually oozes out from lubricant-feeding member 11 along with the elapse of time. Since lubricant-feeding member 11 is arranged close to lip 12d of sealing device 12 (i.e., at the internal side of sealing device 12 in contact with guide rail 1), the oozing lubricant consistently lubricates lip 12d of sealing device 12 over a long period of time.

In the case where lubricant-feeding member 11 is in contact with guide rail 1, the lubricant reaches lip 12d of sealing device 12 via the surface of guide rail 1, thus resulting in an especially consistent feeding of the lubricant to lip 12d. Due to these mechanisms, the abrasion of lip 12d of sealing device 12 is minimized whereby a preferable sealing condition of sealing device 12 is maintained over a long period preventing the intrusion of foreign matter into slider body 2A. Hence, the life of the linear guide apparatus itself can be expanded.

The lubricant oozing out from lubricant-feeding member 11 is further automatically sent to the rolling element rolling in rolling grooves 3A and 3B for the rolling elements via these grooves of guide rail 1. Due to such a self-lubricating mechanism, the tool smoothly operates over a long period. Accordingly, the tool operates with low torque in a good condition without external feeding of a lubricant to slider 2.

In the case where lubricant-feeding member 11 is contacted with guide rail 1, lubricant-feeding member 11 undergoes self-contraction with the exudation of lubricant. The contractive force acts to press lubricant-feeding member 11 onto the sealed plane of guide rail 1, thus achieving a sealing as well as lubricating function.

Since lubricant-feeding member 11 is inserted between end-cap 2B and sealing device 12 via reinforcing plate 10, lip 12d of sealing device 12 is difficult to be rolled up during the reciprocative movement of slider 2. Therefore, external leaking of the lubricant from the inside of slider 2 hardly takes place.

In the structure of the second embodiment, the fixing hole for grease nipple 7 may be capped with a blind plug. And, with an appropriate interval, the plug may be opened to inject a lubricant such as grease into slider 2.

In the linear guide apparatus of the second embodiment, lubricant-feeding member 11 is fixed at the end of end-cap 2B in a state sandwiched between reinforcing plate 10 and sealing device 12. But generally these members need not always be arranged in this order. Instead, for example, sealing device 12 may be fixed directly at the end of end-cap 2B, and at the end of end-cap 2B holding sealing device 12 lubricant-feeding member 11 sandwiched between two reinforcing plates 10 may be fixed. In such a modified constitution, a similar preferable effect can be achieved so long as lubricant-feeding member 11 is placed sufficiently close to lip 12d of sealing device 12.

Third Embodiment

Figure 4:
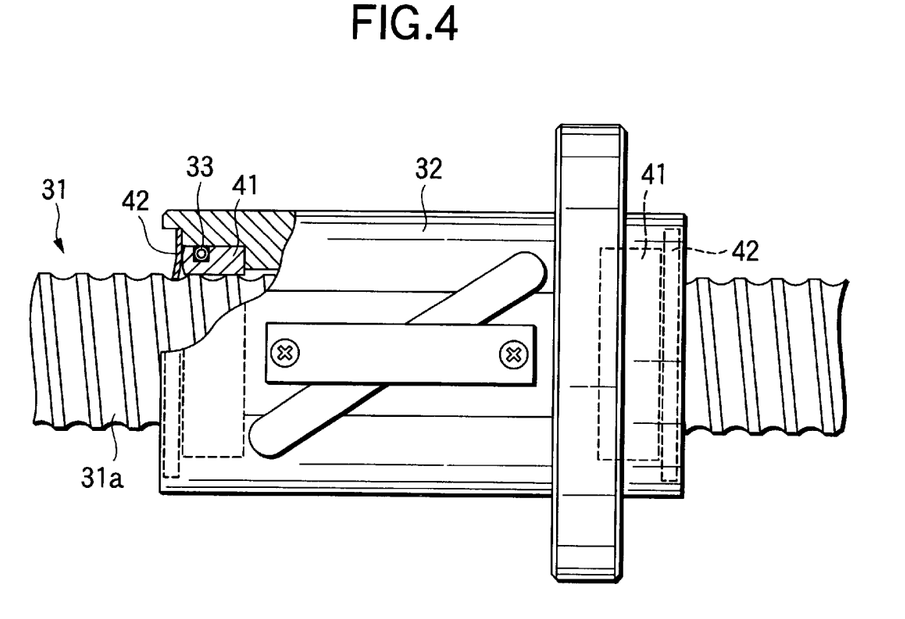
FIG. 4 is the plane view of a ball screw equipped with a sealing device associated with the invention.
Figure 5:
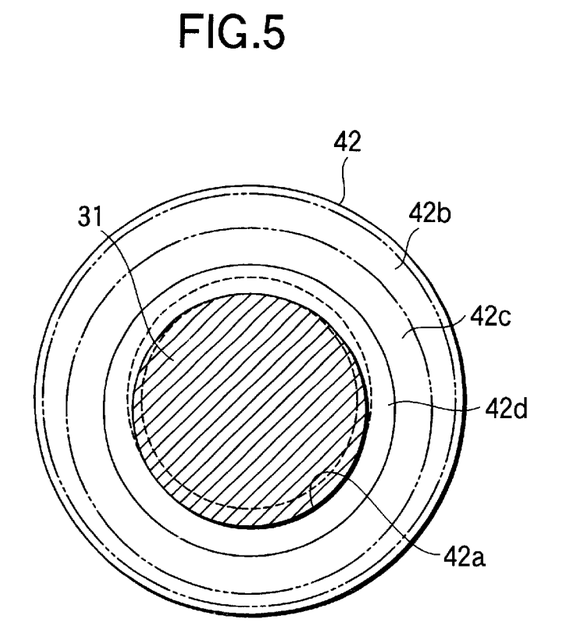
FIG. 5 is the front view of the ball screw depicted in FIG. 4.
Figure 6:
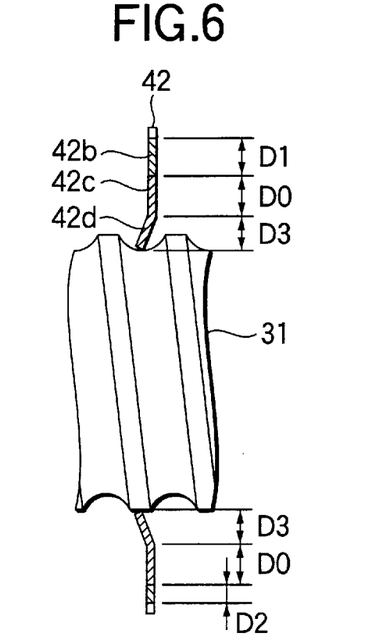
FIG. 6 is a plane view showing the contact portion of the screw groove of the ball screw depicted in FIG. 4 with the sealing device.

FIG. 4 is a plane view showing the structure of a ball screw equipped with a sealing device associated with the invention. Part of the structure is broken to show the significant internal portion. FIG. 5 is a front view of the ball screw shown in FIG. 4, and FIG. 6 shows a part of the ball screw shown in FIG. 4 where a screw groove 31a of a screw shaft 31 is in contact with a contact-type sealing device 42.

The ball screw comprises a screw shaft 31 on which the spiral screw groove 31a with an arc-shaped cross-section is cut at its outer periphery, a cylindrical ball screw nut 32 having a spiral screw groove on the inner surface thereof facing screw groove 31a of screw shaft 31, said nut being fitted to screw shaft 31, and a number of balls (not shown) that freely roll along the ball-rolling space formed by screw groove 31a of screw shaft 31 and the screw groove of ball screw nut 32 and having a substantially circular cross-section.

At the inner side of each end of ball screw nut 32 in the shaft direction, a cylindrical lubricant-feeding member 41 made of a lubricant-containing polymer is inserted, the inner surfaces of which is in contact engagement with the outer periphery of screw shaft 31, but is not in contact with screw groove 31a. This lubricant-feeding member 41 is made of two semicircular members and has fine grooves at their outer surfaces. By means of a gutter spring 33 arranged in the fine grooves, lubricant-feeding member 41 is always pushed radially toward the outer periphery of screw shaft 31 at a constant pressure. Even after the inner periphery of lubricant-feeding member 41 is worn out by repeated operations over a long period, a proper contact with screw shaft 31 is maintained to secure a desirable lubrication.

The composition of the lubricant-containing polymer used for lubricant-feeding member 41 is common but not restricted to that of lubricant-feeding member 11 of the second embodiment permitting suitable alterations.

At the outer sides along the shaft direction of lubricant-feeding member 41 are fitted contact-type sealing devices 42 by pressure. Each of these sealing devices 42 comprises metal or plastic mandrel (reinforcing member) 42b, disk-formed seal body 42c including mandrel 42b, and sealing tip 42d that extends inward from seal body 42c and is shaped as a part of a cone (In the figure, the tip is slanted to the left.).

Sealing tip 42d has at its central aperture 42a that corresponds to the cross-sectional shape of screw shaft 31 and has an inner diameter slightly shorter than screw shaft 31. Sealing body 42c the outer periphery of which is fixed at ball screw nut 32 (not shown in FIG. 5) and sealing tip 42d are fabricated into an integrated member with the same rubber material composition as in the previous Example 1. The type of the rubber material composition can be changed appropriately. Further, the member made of the rubber material composition is unified with mandrel 42b by means of vulcanization adhesion. The formulation for the rubber material composition is not restricted to that used in Example 1, but can be modified according to need.

Though the outer periphery of mandrel 42b is circular, the inner periphery has a similar shape to that of central aperture 42a; as is shown in FIG. 6, width D2 at the bottom portion is narrower than width D1 at the top portion. Accordingly, distance D0 from the inner periphery of mandrel 42b to that of seal body 42c, and distance D3 from the inner periphery of seal body 42c to that of sealing tip 42d can be made constant throughout the total peripheral length. Thus, the degree of deflection of sealing device 42 induced by its contact with screw shaft 31 can be almost constant.

Figure 7:
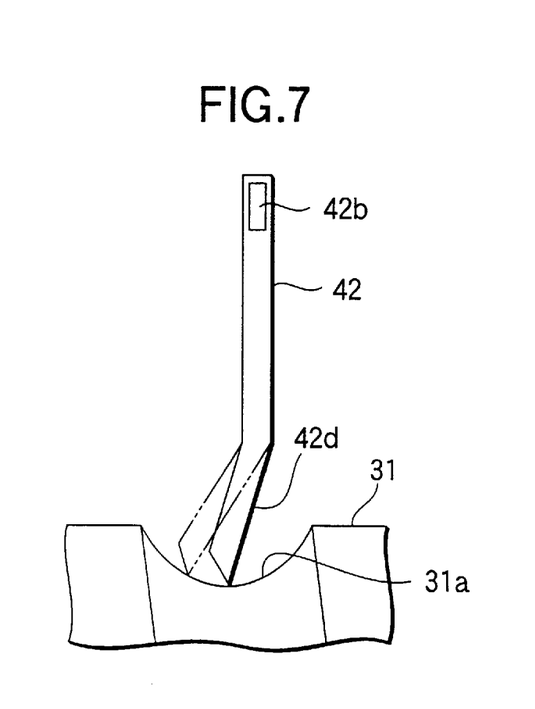
FIG. 7 is an enlarged view showing a condition under which the sealing device contacts with the screw groove of the screw shaft.

FIG. 7 is a partial enlarged view showing a condition under which sealing device 42 is deformed by the contact with screw shaft 31. While the solid lines show the shape of sealing device 42 that is not in contact with screw shaft 31, the two dot-dashed lines show the deformed shape of 42 by contacting screw shaft 31. The contact point (lip portion) of sealing tip 42d in sealing device 42 always becomes an exposed thread relative to the outer periphery as well as screw groove 31a of screw shaft 31 (Actually, the gap is kept below 0 owing to deformation.)

As is evident from FIG. 7, indifferently to what part (either the outer periphery or groove 31a) of screw shaft 31 is in contact with sealing device 42, one can accurately predict from the shape of the device the direction in which sealing tip 42d will be deflected. Accordingly, one can readily design the shape of sealing tip 42d so as to achieve optimized sealing characteristics. The detailed constitution and shapes for sealing device 42 are not restricted to this third embodiment alone.

When ball screw nut 32 is displaced, the inner space is certainly sealed by sealing device 42 in a slidable contact with screw shaft 31, thus preventing the intrusion of foreign matter including dust from the gap between screw shaft 31 and ball screw nut 32 and the leakage of lubricant to the outside of ball screw nut 32. With such a mechanism, life extension of the ball screw is achieved. Furthermore, sealing device 42 exhibits an excellent sealing capability thanks to the lubricant that oozes out from lubricant-feeding member 41, and prevents the abrasion of the lip.

Since this sealing device 42 for ball screws uses a rubber material composition made of a similar composition to the one used in Example 1, the rubber material composition will neither deteriorate nor undergo strength reduction when the ball screw is operated under an environment where chemicals containing various additives such as amine-based additives contact therewith. Therefore, the life of the ball screw is sufficiently long even when it is used under such environments.

Fourth Embodiment

Figure 8:
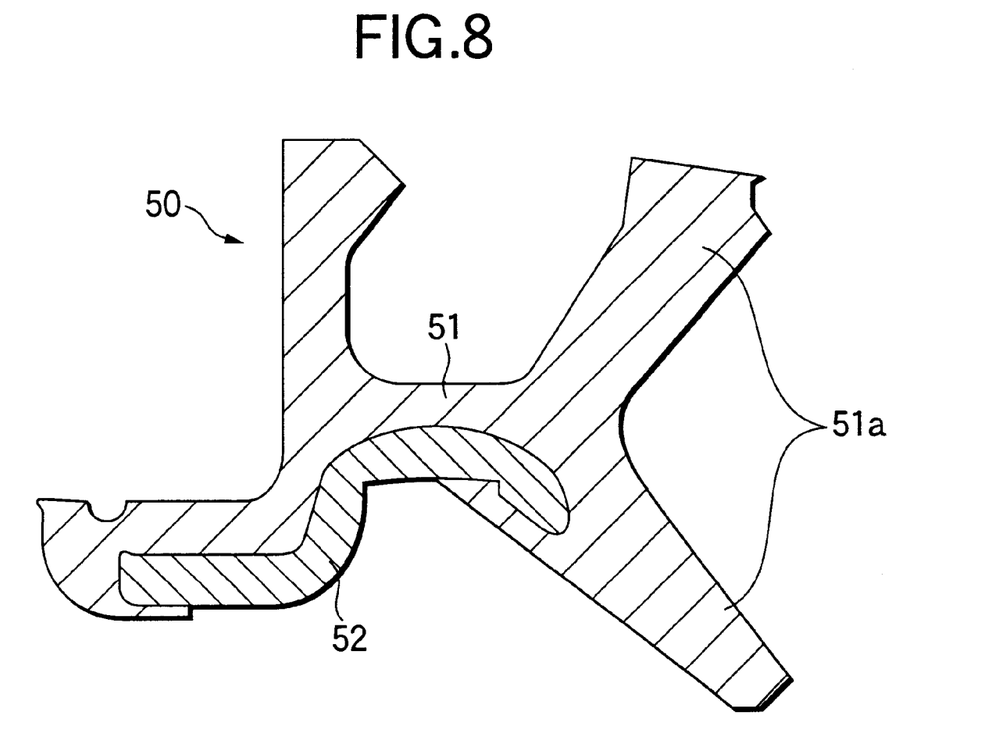
FIG. 8 is a cross-sectional view of a contact-type sealing device used in a rolling bearing for water pumps.

FIG. 8 is a cross-sectional view of a contact-type sealing device 50 used for, for example, rolling bearings for water pumps.

This sealing device 50 comprises a rubber-made part 51 having lip 51a and a mandrel 52 made of metal and the like.

Since this rubber-made member 51 consists of a rubber material composition made of a similar composition to the one used in Example 1, the rubber material composition will neither deteriorate nor undergo strength reduction when the water pump is operated under an environment where chemicals containing various additives such as amine-based additives contact therewith. Therefore, the life of the water pump is sufficiently long even when it is used under such environments. The type of the rubber material composition is not restricted to that used in Example 1, but can be appropriately modified according to needs.

Further, the adhesion of rubber-made member 51 to metal mandrel 52 is excellent, and such an adhesive property is not weakened by the contact with chemicals containing various additives such as amine-based additives.

Fifth Embodiment

Figure 9:
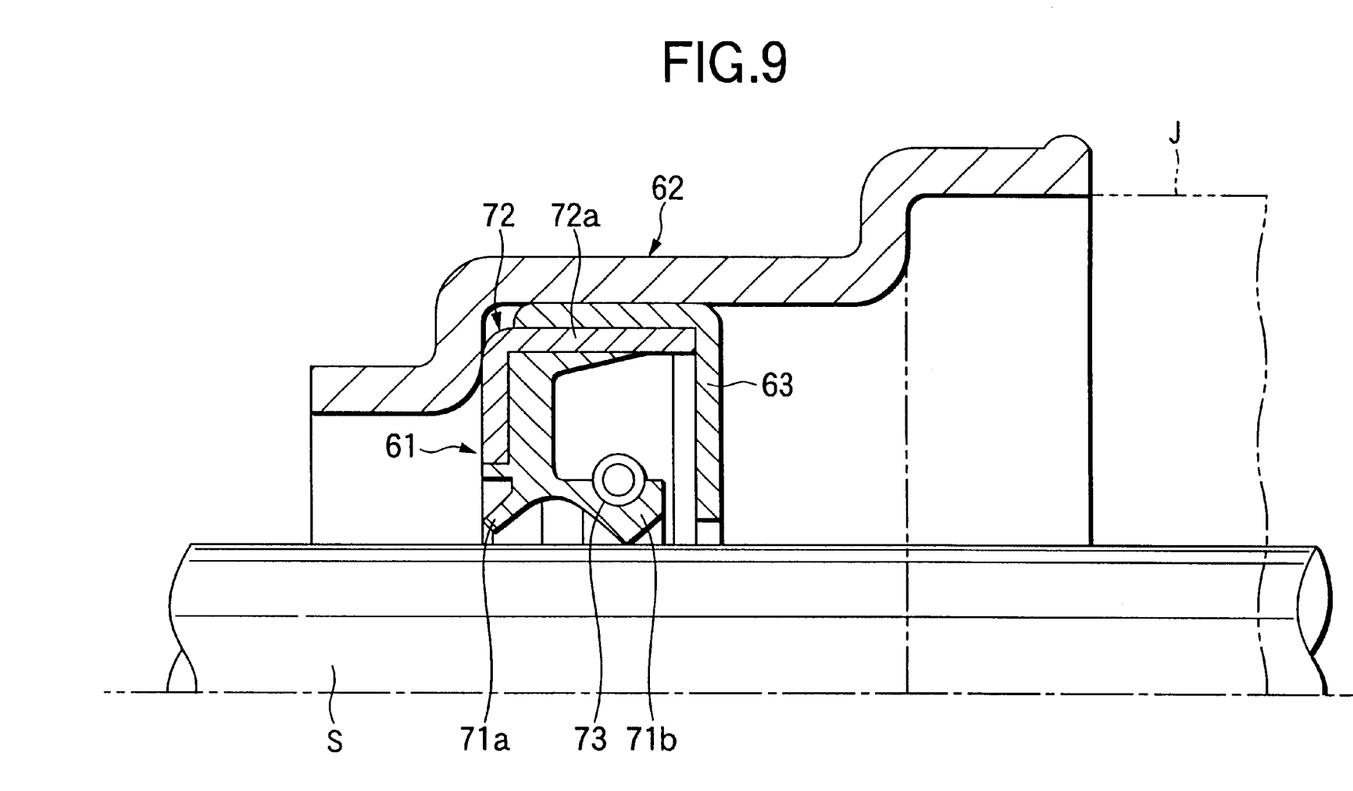
FIG. 9 is a cross-sectional view showing the structure for fitting an oil seal for a spindle used in combination with a rolling bearing.

FIG. 9 shows, in a cross-sectional view showing the structure for fitting an oil seal 61 used in combination with a rolling bearing J.

This oil seal 61 that has a dust lip 71a is equipped a gutter spring 73 arranged at the outer periphery of a main lip 71b. After oil seal 61 is inserted between a shaft S and a seal case 62, a spring cover 63 is pushed in the gap between seal case 62 and the engaging part 72a of a metal ring 72 to fix oil seal 61.

This main lip 71b of oil seal 61 having such a structure acts to perfectly seal the surround of rolling bearing J, preventing the intrusion of foreign matter and the leakage of lubricant outside the seal case.

Since main lip 71b and dust lip 71a of oil seal 61 consist of a rubber material composition made of a similar composition to the one used in Example 1, the rubber material composition will neither deteriorate nor undergo strength reduction when the rolling bearing J is operated under an environment where chemicals containing various additives such as amine-based additives contact therewith. Therefore, the life of the rolling bearing J is sufficiently long even when it is used under such environments. However, the type of the rubber material composition is not restricted to that used in Example 1, but can be appropriately modified according to needs.

In the first to fifth embodiments described heretofore, the sealing devices are equipped in various rolling apparatuses such as a linear guide apparatus, a ball screw or rolling bearing. However, since the sealing device of the invention can be used to seal still other types of rolling apparatuses and other machinery or tools, the scope of the invention is not restricted to those embodiments described above at all.

As has been explained heretofore, the sealing device of the invention has a long life even when used in an environment where chemicals including cutting lubricants containing additives that have an adverse effect on rubbers contact with the sealing device, since no deterioration proceeds.

Further, the rubber material composition composing the sealing device excels in the adhesion to reinforcing members made of metals, etc., and such excellent adhesive property is not deteriorated when brought into contact with the chemicals containing the above-described additives.

Moreover, since the above-described rubber composition excels in mold-releasing property, too, it can be molded into a complicated shape with a high preciseness.

While the invention has been described in detail and with reference to specific embodiments thereof, it will be apparent to one skilled in the art that various changes and modifications can be made therein without departing from the spirit and scope thereof.

What is claimed is:

1. A linear guide apparatus comprising a seal having a lip made of a rubber material composition, wherein said rubber material composition comprises 100 parts by weight of a tetrafluoroethylene-propylene copolymer and 0.02 to 10 parts by weight of an ethylene-propylene-based copolymer.

2. A ball screw comprising a seal having a lip made of a rubber material composition, wherein said rubber material composition comprises 100 parts by weight of a tetrafluoroethylene-propylene copolymer and 0.02 to 10 parts by weight of an ethylene-propylene-based copolymer.

3. A roller bearing for a water pump comprising a seal having a lip made of a rubber material composition, wherein said rubber material composition comprises 100 parts by weight of a tetrafluoroethylene-propylene copolymer and 0.02 to 10 parts by weight of an ethylene-propylene-based copolymer.

* * * * *